Oct. 9, 1945.  W. G. THOMPSON  2,386,369
ELECTROMAGNETIC PUMP FOR ELECTRICALLY CONDUCTING LIQUIDS
Filed June 4, 1943

INVENTOR
WILLIAM GEORGE THOMPSON
BY
ATTORNEY

Patented Oct. 9, 1945

2,386,369

UNITED STATES PATENT OFFICE 2,386,369

ELECTROMAGNETIC PUMP FOR ELECTRICALLY CONDUCTING LIQUIDS

William George Thompson, Sutton Coldfield, England, assignor to The General Electric Company Limited, London, England Application June 4, 1943, Serial No. 489,608
In Great Britain June 15, 1942

23 Claims. (Cl. 103—1)

This invention relates to electromagnetic mercury pumps of the type in which the mercury is forced to flow along a channel by the reaction between an electric current passing through the mercury having a component perpendicular to the direction of flow of the mercury and a magnetic field having a component perpendicular both to the said electric current and to the said direction of flow. Here and hereinafter the term mercury is to be interpreted so as to include any electrically conducting liquid of which mercury is a main component.

Such pumps are useful for producing within a mercury arc converter a jet of mercury for the purpose described in Patents Nos. 2,225,757 and 2,257,790. It is then often desirable that the pump should be outside the main casing of the converter; the walls of the pump have then to be impervious to the atmosphere. An object of this invention is to provide a simple and convenient form of pump with impervious walls.

It is desirable for mechanical reasons that the walls of the channel should be mainly or entirely of metal. If they are of metal where the current is passed through the mercury, it is necessary that the current passing through the mercury should be as great as or not much less than that passing through the metal wall. If the wall is made of a single metal, it is difficult to fulfil this condition. For, though there are mechanically suitable alloys whose electrical conductivity is less than or not much greater than that of mercury (for example nickel-chromium alloys), these alloys, unless specially cleaned, are coated with a layer of oxide which has a considerable resistance; current introduced into a wall of the alloy tends to flow round the wall rather than to pass through the surface layer into the mercury contained within the wall.

A further object of the invention is to overcome this difficulty by providing within a wall of such an alloy electrodes of a metal (which term is to be read as including an alloy), for example nickel or iron, with which mercury normally makes good electrical contact. Preferably these electrodes pass through the wall; for then the difficulty of securing good contact between the electrodes and the wall is avoided; moreover, since the conductivity of nickel and other metals suitable for this purpose is much greater than that of the said nickel-chromium alloys, the tendency of the currents to pass along the wall is reduced. But it is permissible that the whole of the electrode should be within the wall.

For a given ratio between the conductivity of the wall and that of the mercury, and a given ratio between the thickness of the wall and the mean diameter of the channel enclosed by it, the ratio of the current through the mercury to that passing round the wall is in general greater the less is the ratio of the diameter of the tube along the direction of the current to the diameter in the perpendicular direction. This consideration suggests that the tube should be flattened with its shorter dimension parallel to the line joining the contact pieces. On the other hand, it is desirable that the magnetic field should be large and that the gap between the pole pieces should be small. Since the magnetic field is perpendicular to the current, this suggests that the diameter of the tube perpendicular to the current should be as small as possible. I have found that the second of these considerations usually outweighs the first. Accordingly another object of the invention is to provide an improved electromagnetic pump fulfilling this requirement.

One embodiment of the invention, and certain modifications thereof, will now be described by way of example with reference to the accompanying drawing, in which.

Figure 1:
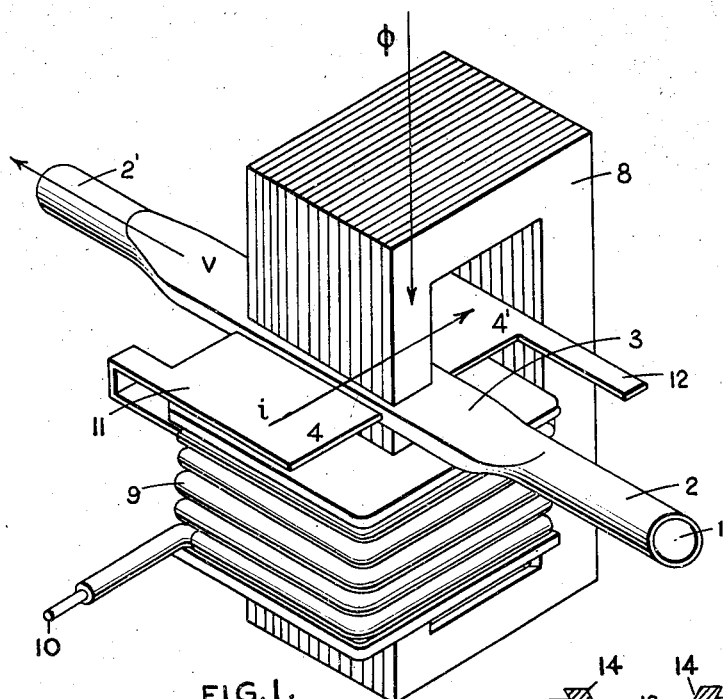
Figure 1 is a perspective view of the embodiment.

In the construction shown in Figure 1, the channel for the mercury required to be pumped is a tube impervious to the atmosphere whose wall is composed wholly or mainly of an alloy whose electrical conductivity is less than or not much greater than that of mercury, and electrodes are provided, of a metal or alloy (different from the aforesaid alloy) with which mercury normally makes good electrical contact, part at least of whose surface is within the wall and in the said field and between which current is adapted to pass perpendicular both to the field and the axis of the tube. The condition that the wall is mainly of the said alloy does not necessarily imply that the said alloy predominates in a cross-section of the wall through the contact pieces, though this will often be the case; the condition will be fulfilled so long as there is a length of the tube in the neighbourhood of the field of whose total composition the alloy forms much the greater part; thus, if in a said cross-section, the wall were largely of a material other than the said alloy, the condition would still be fulfilled if there were on either or both sides of the cross-section a sufficiently long piece of tube composed wholly of the alloy.

Figure 3:
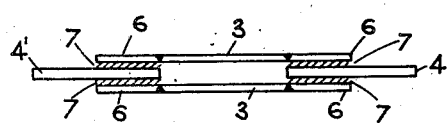
Figure 3 shows a modification of the construction shown in Figure 2, Figures 4 and 5 show in cross section two further modifications of the central part of the tube.
Figure 2:
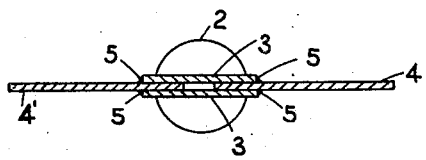
Figure 2 is a cross section of the central part of a tube appearing in Figure 1.

In Figure 1, the tube 1 is of the high-resistance alloy known by the trade name Inconel and said to consist mainly of nickel, chromium and iron. In its parts 2, 2' remote from the magnetic field, it is of circular section, 3.5 mm. in external diameter and with a wall 0.3 mm. thick. The part 3 lying in the magnetic field is flattened so that the longest dimension of its cross-section is about 5 mm. and the shortest about 1 mm. This part 3 is slit on either side in the plane of its longest dimension, and through the slit nickel strips 4, 4' are introduced, terminating within the tube. As shown in Figure 2, which is a cross section of the part 3 near its centre, the nickel strips are copper-brazed to the wall 3 along the line 5. In a modification, shown in Figure 3, strips 6 of iron are copper-brazed to the edges of the slits; iron electrodes 4, 4' are cemented to the iron strips by vitreous enamel 7. Iron is used in place of nickel, because it is better adapted to combine with the usual vitreous enamels.

The magnet generating the field (Figure 1) consists of a laminated iron horse-shoe 8 on one limb of which is wound the exciting coil 9, of which one terminal 10 is shown. The strip 4, acting as one electrode, is connected to the coil, as shown at 11; the strip 4', acting as the other electrode, is provided with a terminal 12. The arrows marked, $i$, $\phi$, $v$ show respectively the directions of the electric current between the electrodes, the magnetic field in the gap, and the flow of the mercury.

Figure 4:
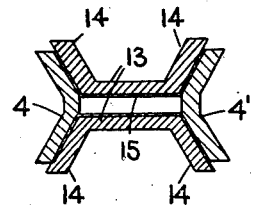
Figure 5:
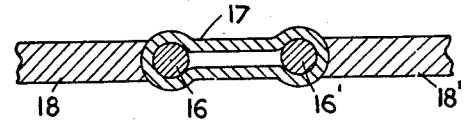

Alternative methods of providing electrodes according to the invention are shown in Figures 4 and 5, though in the precise form there shown they are not so well adapted to be used in the embodiment of Figure 1. In Figure 4, the parts 13 are continuous with the main wall of the tube outside the magnetic field; these are bent back at their edges 14 so as to form a V on either side of the tube. Into this V the electrodes 4, 4' are cemented with vitreous enamel 15. If the enamel is continued so as to cover the surface of the parts 13 in contact with the mercury, the conductivity of the metal 13 is unimportant. In Figure 5 the electrodes lie wholly within the wall. The wall 17 is continuous; 16, 16' are nickel wires acting as electrodes within the wall and making good electrical contact with it; 18, 18' are copper leads attached to the outside of the wall.

I claim:

1. For use in an electromagnetic pump of the character described in which mercury is caused to flow by an electric current and a magnetic field angularly disposed to each other and to the direction of flow of the mercury: a metallic conduit physically distinct from the magnet which generates said magnetic field, said conduit being impervious to the atmosphere and having a portion transversely disposed in the magnetic field, said portion comprising a pair of opposed walls composed of an alloy whose electric conductivity at most does not substantially exceed mercury, said walls extending transversely to the magnetic field, said portion of the conduit also including another pair of opposed walls extending parallel to the magnetic field and composed of a metal different from said alloy and with which mercury normally makes good electrical contact, said second named pair of opposed walls being adapted to be connected to a source of electric potential to pass current through the mercury, said pairs of opposed walls being joined to form a passageway, principally composed of metal, through which the mercury is caused to flow.

2. For use in an electromagnetic pump of the character described in which mercury is caused to flow by an electric current and a magnetic field angularly disposed to each other and to the direction of flow of the mercury: a metallic conduit physically distinct from the magnet which generates said magnetic field, said conduit being impervious to the atmosphere and having a portion transversely disposed in the magnetic field, said portion comprising a pair of opposed walls composed of an alloy whose electric conductivity at most does not substantially exceed mercury, said walls extending transversely to the magnetic field, said portion of the conduit also including another pair of opposed walls extending parallel to the magnetic field and composed of a metal different from said alloy and with which mercury normally makes good electrical contact, said second named pair of opposed walls being adapted to be connected to a source of electric potential whereby to serve as electrodes to pass current through the mercury, said pairs of opposed walls being directly joined to form a passageway, wholly composed of metal, through which the mercury is caused to flow.

3. For use in an electromagentic pump of the character described in which mercury is caused to flow by an electric current and a magnetic field angularly disposed to each other and to the direction of flow of the mercury: a metallic conduit physically distinct from the magnet which generates said magnetic field, said conduit being impervious to the atmosphere and having a portion transversely disposed in the magnetic field, said portion comprising a pair of opposed walls composed of an alloy whose electric conductivity at most does not substantially exceed mercury, said walls extending transversely to the magnetic field, said portion of the conduit also including another pair of opposed walls extending parallel to the magnetic field and composed of a metal different from said alloy and with which mercury normally makes good electrical contact, said second named pair of opposed walls being adapted to be connected to a source of electric potential whereby to serve as electrodes to pass current through the mercury, said pairs of opposed walls being directly joined by welding to form a passageway, wholly composed of metal, through which the mercury is caused to flow.

4. For use in an electromagnetic pump of the character described in which mercury is caused to flow by an electric current and a magnetic field angularly disposed to each other and to the direction of flow of the mercury: a metallic conduit physically distinct from the magnet which generates said magnetic field, said conduit being impervious to the atmosphere and having a portion transversely disposed in the magnetic field, said portion comprising a pair of opposed walls composed of an alloy whose electric conductivity at most does not substantially exceed mercury, said walls extending transversely to the magnetic field, said portion of the conduit also including another pair of opposed walls extending parallel to the magnetic field and composed of a metal different from said alloy and with which mercury normally makes good electrical contact, said second named pair of opposed walls being adapted to be connected to a source of electric potential to serve as electrodes to pass current through the mercury, said pairs of opposed walls being joined by vitreous enamel to form a passageway, principally composed of metal, through which the mercury is caused to flow.

5. For use in an electromagnetic pump of the character described in which mercury is caused to flow by an electric current and a magnetic field angularly disposed to each other and to the direction of flow of the mercury: a metallic conduit physically distinct from the magnet which generates said magnetic field, said conduit being impervious to the atmosphere and having a portion transversely disposed in the magnetic field, said portion comprising a pair of opposed walls composed of an alloy whose electric conductivity at most does not substantially exceed mercury, said walls extending transversely to the magnetic field, said portion of the conduit also including another pair of opposed walls extending parallel to the magnetic field and composed of a metal different from said alloy and with which mercury normally makes good electrical contact, said second named pair of opposed walls being adapted to be connected to a source of electric potential to pass current through the mercury, a part at least of the surface of said second named pair of opposed walls lying between said first named pair of walls, said pairs of opposed walls being joined to form a passageway, principally composed of metal, through which the mercury is caused to flow.

6. For use in an electromagnetic pump of the character described in which mercury is caused to flow by an electric current and a magnetic field angularly disposed to each other and to the direction of flow of the mercury: a metallic conduit physically distinct from the magnet which generates said magnetic field, said conduit being impervious to the atmosphere and having a portion transversely disposed in the magnetic field, said portion comprising a pair of opposed walls composed of an alloy whose electric conductivity at most does not substantially exceed mercury, said walls extending transversely to the magnetic field, said portion of the conduit also including another pair of opposed walls extending parallel to the magnetic field and composed of a metal different from said alloy and with which mercury normally makes good electrical contact, said second named pair of opposed walls being adapted to be connected to a source of electric potential to pass current through the mercury, said pairs of opposed walls being joined to form a passageway, principally composed of metal, through which the mercury is caused to flow, said conduit portion being composed mainly of said alloy so that current passing between the electrode will mainly flow through the mercury.

7. For use in an electromagnetic pump of the character described in which mercury is caused to flow by an electric current and a magnetic field angularly disposed to each other and to the direction of flow of the mercury: a metallic conduit physically distinct from the magnet which generates said magnetic field, said conduit being impervious to the atmosphere and having a flattened portion transversely disposed in the magnetic field to provide two pairs of opposed walls, one wider than the other, which define the interior of the conduit, said conduit being composed of an alloy whose electric conductivity does not substantially exceed mercury, the wider pair of opposed walls of said flattened portion extending transversely to the magnetic field and the narrower pair of opposed walls of said flattened portion extending parallel to the magnetic field and being composed of a metal different from said alloy and with which mercury normally makes good electrical contact, said narrower pair of opposed walls being adapted to be connected to a source of electric potential whereby to serve as electrodes to pass current through the mercury, said pairs of opposed walls being joined to form a passageway, principally composed of metal, through which the mercury is caused to flow.

8. A conduit as set forth in claim 7 wherein the pairs of opposed walls are joined by welding so as to form impervious joints.

9. A conduit as set forth in claim 7 wherein the pairs of opposed walls are joined by vitreous enamel so as to form impervious joints.

10. A conduit as set forth in claim 7 wherein the wider pair of opposed walls have extensions which embrace between them the narrower pair of opposed walls.

11. A conduit as set forth in claim 7 wherein the wider pair of opposed walls have coplanar extensions which embrace between them the narrower pair of opposed walls.

12. A conduit as set forth in claim 7 wherein the wider pair of opposed walls have coplanar extensions welded thereto which are compatible with vitreous enamel and wherein said extensions embrace between them the narrower pair of opposed walls and are joined thereto by vitreous enamel.

13. A conduit as set forth in claim 7 wherein the wider pair of opposed walls have angular extensions and the narrower pair of opposed walls have angular extensions embraced between the angular extensions of said wider pair of opposed walls and joined thereto.

14. A conduit as set forth in claim 7 wherein the wider pair of opposed walls extend around and enclose the narrower pair of opposed walls outside of the passageway and the electrical connection to said narrower pair of opposed walls is made through the extensions of said wider pair of opposed walls.

15. A conduit as set forth in claim 7 wherein the wider pair of opposed walls is composed of a nickel chromium alloy.

16. A conduit as set forth in claim 7 wherein the wider pair of opposed walls is composed of an alloy of nickel chromium and iron.

17. A conduit as set forth in claim 7 wherein the wider pair of opposed walls is composed of a nickel chromium alloy and the narrower pair of opposed walls is composed of nickel.

18. A conduit as set forth in claim 7 wherein the wider pair of opposed walls is composed of a nickel chromium alloy and the narrower pair of opposed walls is composed of iron.

19. A conduit as set forth in claim 7 wherein the narrower pair of opposed walls is composed of nickel and is welded to the wider pair of opposed walls.

20. A conduit as set forth in claim 7 wherein the wider pair of opposed walls has iron extension strips welded to the edges thereof and wherein the narrower pair of opposed walls is of iron and is cemented by vitreous enamel to said strips.

21. For use in an electromagnetic pump of the character described in which mercury is caused to flow by an electric current and a magnetic field angularly disposed to each other and to the direction of flow of the mercury: a metallic conduit physically distinct from the magnet which generates said magnetic field, said conduit being impervious to the atmosphere and composed of an alloy whose electrical conductivity at most does not substantially exceed that of mercury, said conduit having a portion transversely disposed in the magnetic field, said conduit portion having a pair of opposed apertures spaced from each other transversely of said field, and a pair of electrodes of a metal different from said alloy and with which mercury normally makes good electrical contact, said electrodes being disposed in said apertures and imperviously joined to the edges thereof.

22. A conduit as set forth in claim 21 wherein the electrodes are joined to the edges of the apertures by welding.

23. A conduit as set forth in claim 21 wherein the electrodes are joined to the edges of the apertures by vitreous enamel.

WILLIAM GEORGE THOMPSON.